US010216648B2

(12) United States Patent
McKeen et al.

(10) Patent No.: US 10,216,648 B2
(45) Date of Patent: *Feb. 26, 2019

(54) MAINTAINING A SECURE PROCESSING ENVIRONMENT ACROSS POWER CYCLES

(71) Applicant: Intel Corporation, Santa Clara, CA (US)

(72) Inventors: Francis X. McKeen, Portland, OR (US); Vincent R. Scarlata, Beaverton, OR (US); Carlos V. Rozas, Portland, OR (US); Ittai Anati, Haifa (IL); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/612,837

(22) Filed: Jun. 2, 2017

(65) Prior Publication Data
US 2017/0270058 A1  Sep. 21, 2017

Related U.S. Application Data

(63) Continuation of application No. 14/525,421, filed on Oct. 28, 2014, now Pat. No. 9,684,608.

(51) Int. Cl.
*G06F 12/14* (2006.01)
*G06F 12/0875* (2016.01)
(Continued)

(52) U.S. Cl.
CPC ........ *G06F 12/1416* (2013.01); *G06F 9/4418* (2013.01); *G06F 12/0804* (2013.01);
(Continued)

(58) Field of Classification Search
CPC ............ G06F 12/1416; G06F 12/0875; G06F 12/1408; G06F 2212/1052; G06F 2212/452
See application file for complete search history.

(56) References Cited

U.S. PATENT DOCUMENTS 9,684,608 B2 * 6/2017 McKeen ............. G06F 12/1416
2008/0244292 A1 10/2008 Kumar et al.
(Continued)

FOREIGN PATENT DOCUMENTS

KR  20140118862 A   10/2014
TW    M450603 U    4/2013
WO   2014143671 A1  9/2014

OTHER PUBLICATIONS

International Preliminary Report on Patentability for Application No. PCT/US2015/053541, dated May 11, 2017, 10 pages.
(Continued)

*Primary Examiner* — Edward J Dudek, Jr.
(74) *Attorney, Agent, or Firm* — Nicholson De Vos Webster & Elliott LLP

(57) ABSTRACT

Embodiments of an invention for maintaining a secure processing environment across power cycles are disclosed. In one embodiment, a processor includes an instruction unit and an execution unit. The instruction unit is to receive an instruction to evict a root version array page entry from a secure cache. The execution unit is to execute the instruction. Execution of the instruction includes generating a blob to contain information to maintain a secure processing environment across a power cycle and storing the blob in a non-volatile memory.

17 Claims, 5 Drawing Sheets

(51) Int. Cl.
*G06F 12/0804* (2016.01)
*G06F 9/4401* (2018.01)
*G06F 21/53* (2013.01)

(52) U.S. Cl.
CPC ...... *G06F 12/0875* (2013.01); *G06F 12/1408* (2013.01); *G06F 12/1441* (2013.01); *G06F 21/53* (2013.01); *G06F 2212/1016* (2013.01); *G06F 2212/1028* (2013.01); *G06F 2212/1052* (2013.01); *G06F 2212/152* (2013.01); *G06F 2212/452* (2013.01); *Y02D 10/13* (2018.01)

(56) References Cited

U.S. PATENT DOCUMENTS

| | | |
|---|---|---|
| 2012/0216049 A1 | 8/2012 | Boivie et al. |
| 2013/0151848 A1* | 6/2013 | Baumann ............... H04L 9/3263 713/164 |
| 2014/0189325 A1 | 7/2014 | McKeen et al. |

OTHER PUBLICATIONS

International Search Report and Written Opinion for Application No. PCT/US2015/053541, dated Feb. 19, 2016, 11 pages.
Non-Final Office Action from U.S. Appl. No. 14/525,421, dated Jun. 9, 2016, 8 pages.
Notice of Allowance from U.S. Appl. No. 14/525,421, dated Feb. 23, 2017, 7 pages.
Notice of Allowance from U.S. Appl. No. 14/525,421, dated Oct. 26, 2016, 7 pages.
Office Action and Search Report from foreign counterpart Taiwan Patent Application No. 104131134, dated Aug. 12, 2016, 19 pages.
Extended European Search Report for Application No. 15854843.8, dated May 24, 2018, 9 pages.

* cited by examiner

METHOD 400

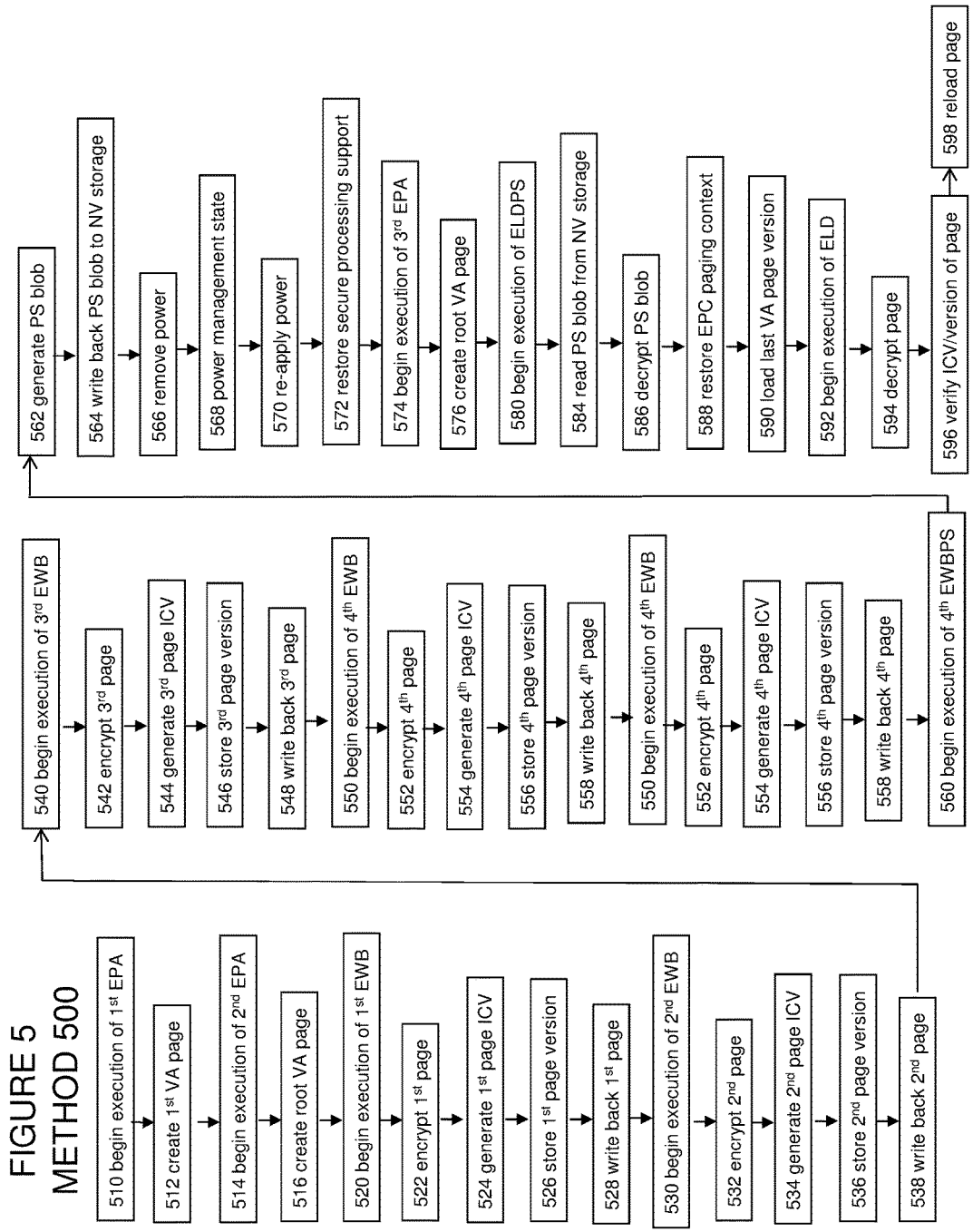

MAINTAINING A SECURE PROCESSING ENVIRONMENT ACROSS POWER CYCLES

BACKGROUND

1. Field

The present disclosure pertains to the field of information processing, and more particularly, to the field of security in information processing systems.

2. Description of Related Art

Confidential information is stored, transmitted, and used by many information processing systems. Therefore, techniques have been developed to provide for the secure handling and storing of confidential information. These techniques include various approaches to creating and maintaining a secured, protected, or isolated container, partition, or environment within an information processing system, many of which operate in a number of different power states.

BRIEF DESCRIPTION OF THE FIGURES

The present invention is illustrated by way of example and not limitation in the accompanying figures.

FIG. 5 illustrates a method for maintaining a secure processing environment across power cycles according to an embodiment of the present invention.

DETAILED DESCRIPTION

Figure 1:
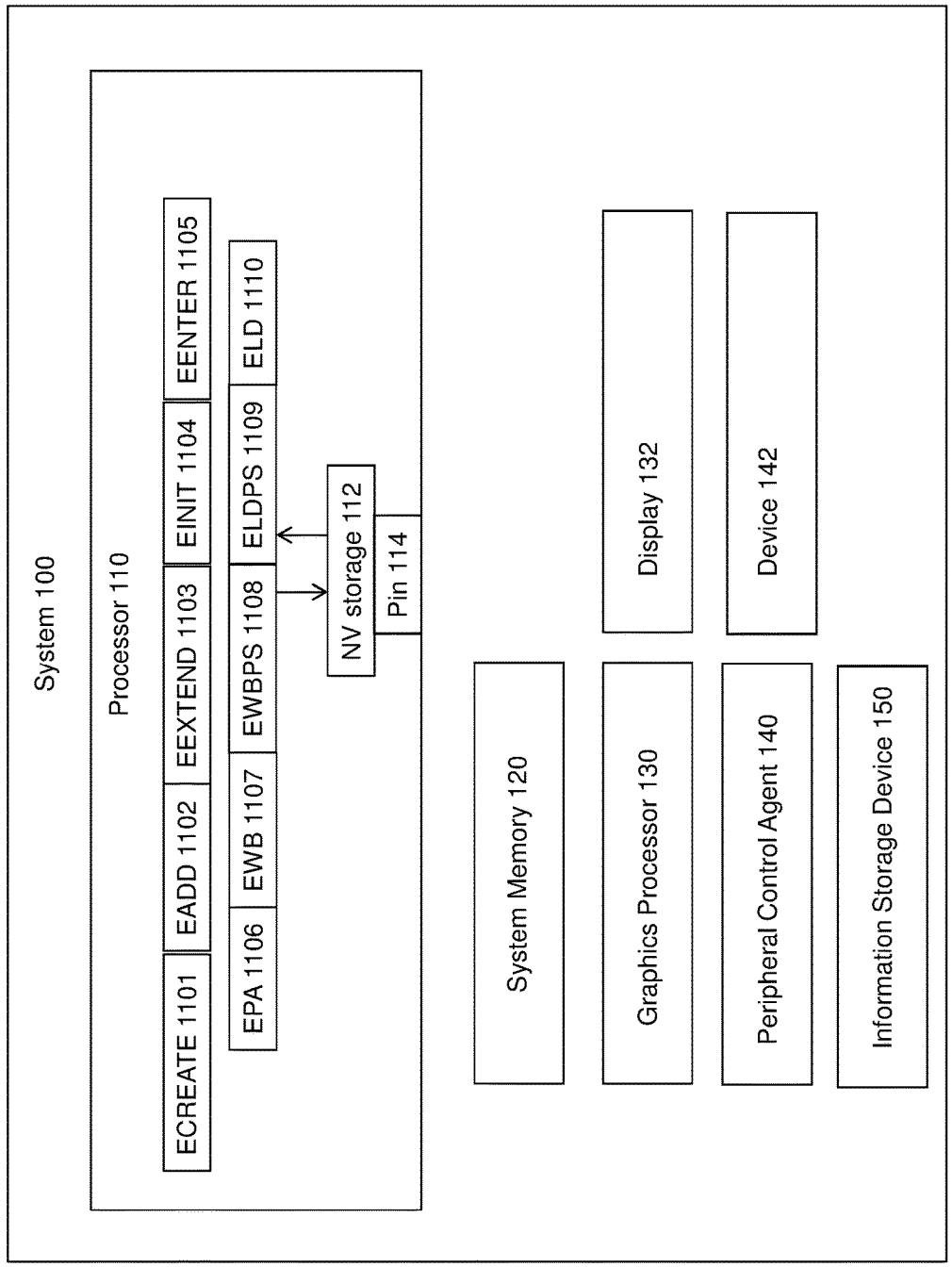
FIG. 1 illustrates a system including support for maintaining a secure processing environment across power cycles according to an embodiment of the present invention.

Embodiments of an invention maintaining a secure processing environment across power cycles are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the present invention, a "I" character between terms may mean that an embodiment may include or be implemented using, with, and/or according to the first term and/or the second term (and/or any other additional terms).

As described in the background section, various approaches to creating and maintaining a secured, protected, or isolated container, partition, or environment within an information processing system have been developed. One such approach involves secure enclaves as described in the co-pending U.S. Patent Application entitled "Method and Apparatus to Provide Secure Application Execution," filed Jun. 19, 2012, Ser. No. 13/527,547, which provides information regarding at least one embodiment of a secured, protected, or isolated container, partition, or environment. However, this reference is not intended to limit the scope of embodiments of the invention in any way and other embodiments may be used while remaining within the spirit and scope of the present invention. Therefore, any instance of any secured, protected, or isolated container, partition, or environment used in any embodiment of the present invention may be referred to herein as a secure enclave or an enclave.

Security properties of a secure enclave may be maintained by ensuring that only a single copy of enclave memory pages or other supporting data structures exist and, in order to prevent replay attacks, that single copy does not survive a standby, sleep, suspend, or other power management state. However, rebuilding an enclave during a resume or return from the power management state may require additional overhead that diminishes responsiveness and performance and increases power consumption. Therefore, embodiments of the present invention may provide for maintaining a secure processing environment across power cycles.

FIG. 1 illustrates system 100, an information processing system in which a secure processing environment may be maintained across power cycles according to an embodiment of the present invention. System 100 may represent any type of information processing system, such as a server, a desktop computer, a portable computer, a set-top box, a hand-held device such as a tablet or a smart phone, or an embedded control system. System 100 includes processor 110, system memory 120, graphics processor 130, peripheral control agent 140, and information storage device 150. Systems embodying the present invention may include any number of each of these components and any other components or other elements, such as peripherals and input/output devices. Any or all of the components or other elements in this or any system embodiment, may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

System memory 120 may be dynamic random access memory or any other type of medium readable by processor 110. Graphics processor 130 may include any processor or other component for processing graphics data for display 132. Peripheral control agent 140 may represent any component, such as a chipset component, including or through which peripheral, input/output (I/O), or other components or devices, such as device 142 (e.g., a touchscreen, keyboard, microphone, speaker, other audio device, camera, video or other media device, network adapter, motion or other sensor, receiver for global positioning or other information, etc.) and/or information storage device 150, may be connected or coupled to processor 110. Information storage device 150 may include any type of persistent or non-volatile memory or storage, such as a flash memory and/or a solid state, magnetic, or optical disk drive.

Processor 110 may represent one or more processors or processor cores integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented.

Processor 110 may operate according to an instruction set architecture that includes the following instructions, each as further described below: a first instruction to create a secure enclave, a second instruction to add content to an enclave, a third instruction to measure content of an enclave, a fourth instruction to initialize an enclave, a fifth instruction to enter an enclave, a sixth instruction to allocate a version array page, a seventh instruction to evict a page from an enclave page cache, an eighth instruction to evict a last version array entry from an enclave page cache before power is removed, a ninth instruction to load a first previously evicted version array entry back into an enclave page cache after power is restored, and a tenth instruction to load a previously evicted page back into an enclave page cache. Although embodiments of the present invention may be practiced with a processor having any instruction set architecture and are not limited to the architecture of a processor family from Intel® Corporation, the instructions may be part of a set of software protection extensions to an existing architecture, and may be referred to herein as an ECREATE instruction, an EADD instruction, an EEXTEND instruction, an EINIT instruction, an EENTER instruction, an EPA instruction, an EWB instruction, an EWBPS instruction, an ELDPS instruction, and an ELD instruction, respectively. Support for these instructions may be implemented in a processor using any combination of circuitry and/or logic embedded in hardware, microcode, firmware, and/or other structures arranged as described below or according to any other approach, and is represented in FIG. 1 as ECREATE logic/hardware 1101, EADD logic/hardware 1102, EEXTEND logic/hardware 1103, EINIT logic/hardware 1104, EENTER logic/hardware 1105, EPA logic/hardware 1106, EWB logic/hardware 1107, EWBPS logic/hardware 1108, ELDPS logic/hardware 1109, and ELD logic/hardware 1110.

FIG. 1 also shows non-volatile storage 112 inside processor 110. Non-volatile storage 112 may include one or more read-writable registers or other storage locations, implemented using any memory or storage technology, in which to store one or more binary large objects ("blobs") containing information to be used to maintain one or more secure processing environments across power cycles according to an embodiment of the present invention. In an embodiment, non-volatile storage may include a 128-bit register to store such a blob, to be written to by EWBPS instructions and read from by ELDPS instructions, as described below. Non-volatile memory may be powered by one or more pins or other electrical connectors 114 on the package of processor 110 such that the contents of non-volatile memory may be retained across power cycles, for example, during standby, sleep, suspend, and/or other power management states when other circuitry in processor 110 may be powered down. Although shown in FIG. 1 as within processor 110, non-volatile storage 112 may be implemented outside of processor 110, for example, within or connected to peripheral control agent 140. In other embodiments, the information to be used to maintain one or more secure processing environments across power cycles according to an embodiment of the present invention may be stored within another secure processing environment that is maintained when processor 110 is powered down; for example, within a trusted execution environment created, provided, and/or maintained by firmware of a security and/or manageability engine.

In embodiments, non-volatile storage 112 may include any type of non-volatile storage, including memory (e.g., static random access memory) to which power is retained across power cycles to maintain its contents, memory (e.g., flash memory) to which power need not be retained across power cycles to maintain its contents, or any combination of types of non-volatile storage. In embodiments, non-volatile storage 112 may be secure, such that the integrity and confidentiality of its contents may be assured (e.g., to processor 110) according to any approach. Note that system 100 may also include other non-volatile storage, such as information storage device 150, which is not written to by EWBPS instructions or read from by ELDPS instructions, and therefore may be less secure than non-volatile storage 112.

Figure 2:
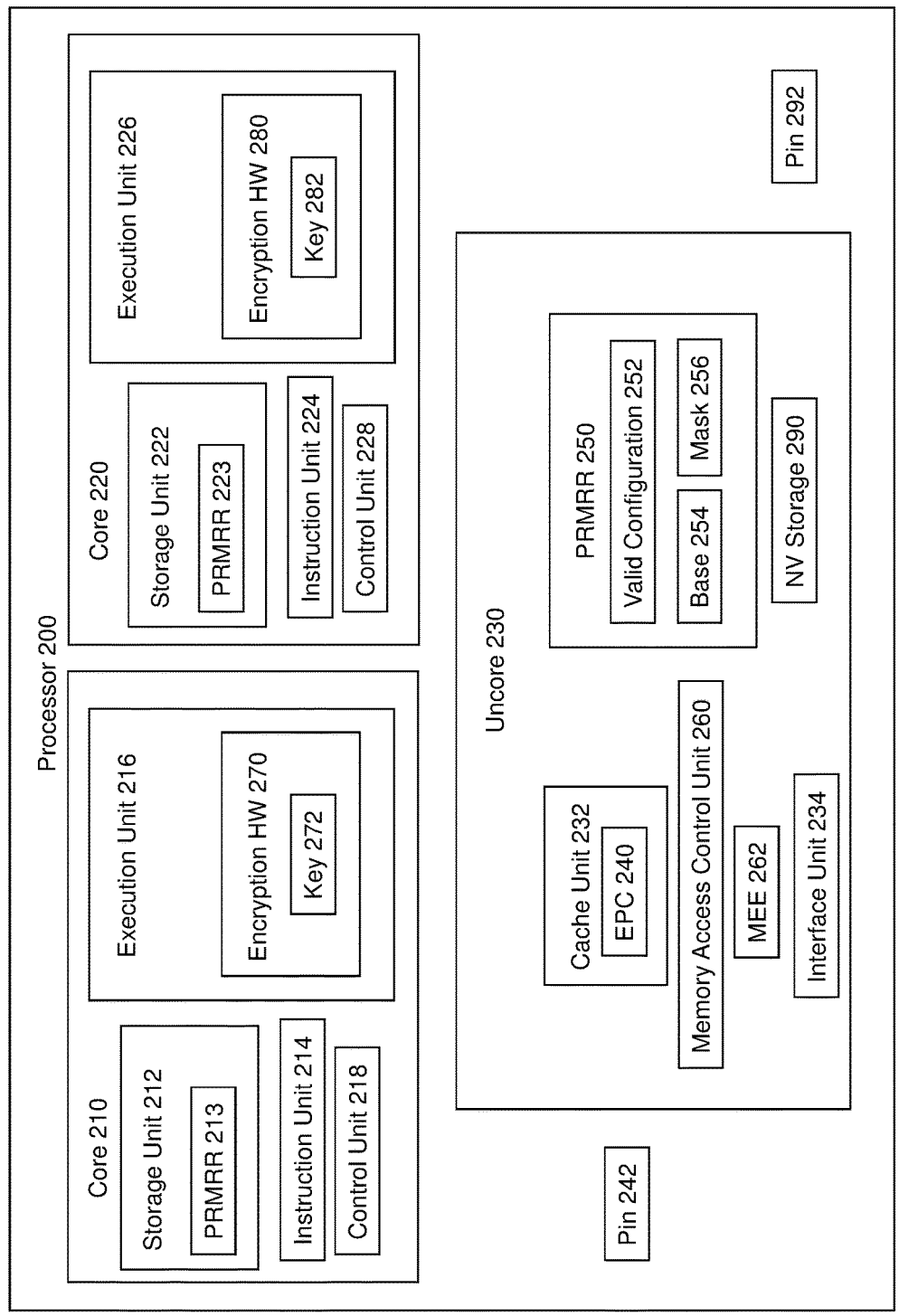
FIG. 2 illustrates a processor including support for maintaining a secure processing environment across power cycles according to an embodiment of the present invention.

FIG. 2 illustrates processor 200, an embodiment of which may serve as processor 110 in system 100. Processor 200 may include core 210, core 220, and uncore 230. Core 210 may include storage unit 212, instruction unit 214, execution unit 216, and control unit 218. Core 220 may include storage unit 222, instruction unit 224, execution unit 226, and control unit 228. Uncore 230 may include cache unit 232, interface unit 234, processor reserved memory range registers 250, memory access control unit 260, and non-volatile storage 290. Processor 200 may also include any other circuitry, structures, or logic not shown in FIG. 2. The functionality of the ECREATE logic/hardware 1101, the EADD logic/hardware 1102, the EEXTEND logic/hardware 1103, the EINIT logic/hardware 1104, the EENTER logic/hardware 1105, the EPA logic/hardware 1106, the EWB logic/hardware 1107, the EWBPS logic/hardware 1108, the ELDPS logic/hardware 1109, and the ELD logic/hardware 1110, as introduced above and further described below, may be contained in or distributed among any of the labeled units or elsewhere in processor 200. Furthermore, the functionality and or circuitry of each of the described and/or illustrated units of processor 200 may be combined and/or distributed in any manner.

Storage units 212 and 222 may include any combination of any type of storage usable for any purpose within cores 210 and 220, respectively; for example, they may include any number of readable, writable, and/or read-writable registers, buffers, and/or caches, implemented using any memory or storage technology, in which to store capability information, configuration information, control information, status information, performance information, instructions, data, and any other information usable in the operation of cores 210 and 220, respectively, as well as circuitry usable to access such storage.

Instruction units 214 and 224 may include any circuitry, logic, structures, and/or other hardware, such as an instruction decoder, to fetch, receive, decode, interpret, schedule, and/or handle instructions to be executed by cores 210 and 220, respectively. Any instruction format may be used within the scope of the present invention; for example, an instruction may include an opcode and one or more operands, where the opcode may be decoded into one or more micro-instructions or micro-operations for execution by execution unit 216 or 226, respectively. One or more instructions, such as the ECREATE, EADD, EEXTEND, EINIT, EENTER, EPA, EWB, EWBPS, ELDPS, and ELD instructions, may be leaves of a first single opcode, such as a privileged secure enclave opcode (e.g., ENCLS), or a second single opcode, such as an unprivileged secure enclave opcode (e.g., ENCLU), where the leaf instructions are specified by the value in a processor register (e.g., EAX). Operands or other parameters may be associated with an instruction implicitly, directly, indirectly, or according to any other approach.

In an embodiment, EWBPS and ELDPS may be leaves of an ENCLS instruction. When processor 200 is used to support a virtualized processing environment, processor 200 may be configured by a virtual machine monitor, hypervisor, or other system software to cause an exit from the virtualized processing environment (a virtual machine exit) in response to an EWBPS or ELDPS instruction. The virtual machine exit may then emulate the behavior of the EWBPS instruction by evicting the root VA page using an EWB instruction and/or the behavior of the ELDPS instruction by reloading the root VA page using an ELD instruction.

Execution units 216 and 226 may include any circuitry, logic, structures, and/or other hardware, such as arithmetic units, logic units, floating point units, shifters, etc., to process data and execute instructions, micro-instructions, and/or micro-operations. Each of execution units 216 and 226 may represent any one or more physically or logically distinct execution units.

Execution units 216 and 226 may include encryption hardware 270 and 280 respectively, which may represent any dedicated or shared circuitry, logic, structures, and/or other hardware to execute any one or more encryption algorithms and the corresponding decryption algorithms, to execute any one or more secure hashing algorithms, and/or to generate any one or more message authentication codes (MACs). Encryption hardware 270 and 280 may use a key, such as key 272 and 282, respectively, each of which may represent any key, such as a processor or platform unique key programmed into processor 200 in a fuse array, generated during a boot process, and/or otherwise available as a secret key to be used for cryptography, for generating MACs, or for any other purpose.

Control units 218 and 228 may include any microcode, firmware, circuitry, logic, structures, and/or hardware to control the operation of the units and other elements of cores 210 and 220, respectively, and the transfer of data within, into, and out of cores 210 and 220. Control units 218 and 228 may cause cores 210 and 220 and processor 200 to perform or participate in the performance of method embodiments of the present invention, such as the method embodiments described below, for example, by causing cores 210 and 220 to execute instructions received by instruction units 214 and 224 and micro-instructions or micro-operations derived from instructions received by instruction units 214 and 224.

Cache unit 232 may include any number of cache arrays in one or more levels of cache memory in a memory hierarchy of information processing system 100, implemented in static random access memory or any other memory technology, along with circuitry, structures, and/or other hardware to control and/or provide for their use and maintenance. Cache unit 232 may be shared among any number of cores and/or logical processors within processor 200 according to any approach to caching in information processing systems. Cache unit 232 may also include one or more memory arrays to be used as enclave page cache (EPC) 240 as further described below.

Interface unit 234 may represent any circuitry, logic, structures, and/or other hardware, such as a link unit, a bus unit, or a messaging unit to allow processor 200 to communicate with other components in a system such as system 200 through any type of bus, point to point, or other connection, directly or through any other component, such as a bridge, hub, or chipset. Interface unit 234 may include one or more integrated memory controllers to communicate with a system memory such as system memory 130 or may communicate with a system memory through one or more memory controllers external to processor 200.

Non-volatile storage 290 represents non-volatile storage 112, as described above. Non-volatile storage 290 may be powered by one or more pins or other electrical connectors 292 on the package of processor 200 such that the contents of non-volatile storage 290 may be retained across power cycles, for example, during standby, sleep, suspend, and/or other power management states when other circuitry in processor 200 may be powered down. Although shown in FIG. 2 as within uncore 220, non-volatile storage 290 may be included within one or more cores of a processor, or may be implemented outside of processor 200, as described above.

Processor reserved memory range registers (PRMRR) 213, 223, and 250 may represent any one or more storage locations in storage units 212 and 222, elsewhere in processor 200, and/or copies thereof in uncore 230. PRMRR 213/223/250 may be used, for example by configuration firmware such as a basic input/output system, to reserve one or more physically contiguous ranges of memory called processor reserved memory (PRM). Memory access control unit 260 may represent any circuitry, structures, logic, and/or other hardware anywhere in processor 200 that may control access to PRM such that EPC 240 may be created within the system memory space defined as PRM.

In an embodiment, PRM is of a size that is an integer power of two, e.g. 32 MB, 64 MB, or 128 MB, and is aligned to a memory address that is a multiple of that size. PRMRR 213/223/250 may include one or more instances of a read-only PRMMR valid configuration register 252 to indicate the valid sizes to which PRM may be configured, one or more instances of a PRMMR base register 254 and a PRMMR mask register 256 to define one or more base addresses and ranges of PRM.

EPC 240 is a secure storage area in which software may be protected from attacks by malware operating at any privilege level. One or more secure enclaves may be created such that each enclave may include one or more pages or other regions of EPC 240 in which to store code, data, or other information in a way that it may only be accessed by software running inside that enclave. For example, a secure enclave may be used by a software application so that only that software application, while running inside that enclave, may access the contents of that enclave. No other software, not even an operating system or a virtual machine monitor, may read the unencrypted contents of that enclave, modify the contents of that enclave, or otherwise tamper with the contents of that enclave while the content is loaded into the EPC (assuming that the enclave is a production enclave, as opposed to, for example, a debug enclave). However, the contents of the enclave may be accessed by software executing from within that enclave on any processor in system 100. This protection is accomplished by the memory access control unit 260 operating according to the secure enclaves architecture.

In FIG. 2, EPC 240 is shown in cache unit 232, where it may be a sequestered portion of a shared cache or a dedicated memory. Within or on the same die as processor 200, EPC 240 may be implemented in static random access memory, embedded dynamic random access memory, or any other memory technology. EPC 240 may also or additionally be implemented external to processor 200, for example within a secure region of system memory 130. To protect the content of secure enclaves when it is transferred off-die, encryption hardware 270 and/or 280 may be used (e.g., in the execution of EWB and ELD instructions) to encrypt the content before it is transferred off-die and to decrypt the content transferred back into EPC 240 on-die. Processor 200 may also include other encryption hardware (for example, memory encryption engine 262 in uncore 230 may provide for all or part of EPC 240 to be implemented/stored in system memory 120) and/or other hardware to implement protection mechanisms to protect the content from replay and other attacks.

Figure 3:
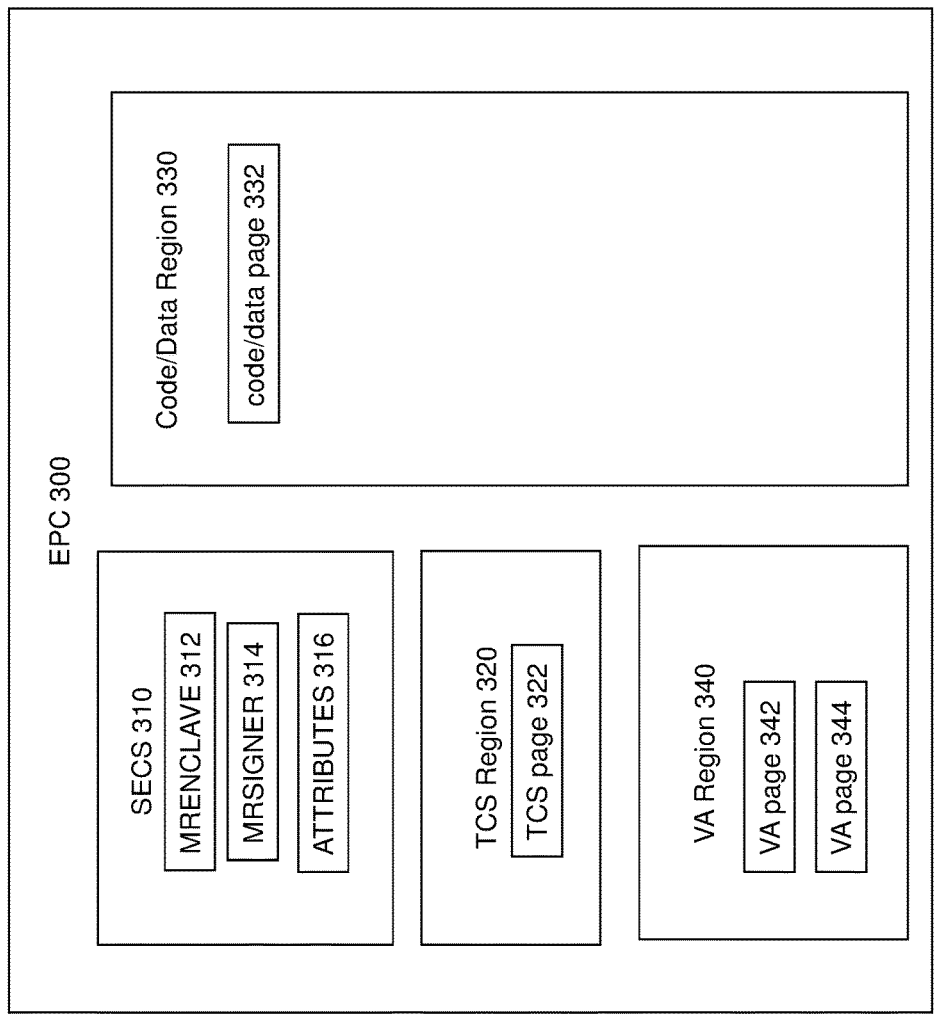
FIG. 3 illustrates an enclave page cache according to an embodiment of the present invention.

FIG. 3 illustrates EPC 300, an embodiment of which may serve as EPC 240 in FIG. 2. In FIG. 3, EPC 300 includes secure enclave control structure (SECS) 310, thread control structure (TCS) region 320, code/data region 330, and version array (VA) region 340. Although FIG. 3 shows EPC 300 divided into four separate regions, EPC 300 may be divided into any number of chunks, regions, or pages, each of which may be used for any type of content. In one embodiment, EPC 300 is divided into 4 kilobyte (KB) pages and is aligned to an address in system memory 130 that is a multiple of 4 KB, SECS 310 may be any one of the 4 KB pages in EPC 300, TCS region 320 may be any number of contiguous or non-contiguous 4 KB pages, code/data region 330 may be any number of contiguous or non-contiguous 4 KB pages, and VA region 340 may be any number of contiguous or non-contiguous 4 KB pages. Furthermore, although FIG. 3 shows one SECS, one TCS region, and one code/data region corresponding to one secure enclave, an EPC may include any number of SECS and any number of TCS and code/data regions, so long as each enclave has one and only one SECS, each valid TCS and valid code/data region (e.g., page) belongs to one and only one enclave, and all of the SECS, TCS, code/data pages, and VA pages fit within the EPC (or may be paged out of and back into the EPC).

An SECS may be created by the execution of the ECREATE instruction to contain metadata to be used by hardware, and accessible only by hardware (i.e., not readable, writable, or otherwise accessible by software, whether running inside or outside the enclave), to define, maintain, and protect the enclave. For example, SECS 310 includes a first measurement register (MRENCLAVE) 312, which may be any size field within SECS 310; in one embodiment, MRENCLAVE 312 may be 32 bytes. MRENCLAVE 312 is to store the build measurement (as described below) of the enclave, which is initialized by the ECREATE instruction, updated by every EADD and EEXTEND instruction associated with the enclave, and locked by the EINIT instruction associated with the enclave. SECS 310 also includes a second measurement register (MRSIGNER) 314 to store a measurement of an identifier, such as a public key, of the entity that verified the creation of the enclave, as further described below. In one embodiment, MRSIGNER 314 may be 32 bytes. Enclave attributes, as described below, may be stored in ATTRIBUTES field 316, which in one embodiment may have a size of 16 bytes.

One or more TCSs may also be associated with a secure enclave. A TCS contains metadata used by the hardware to save and restore thread specific information when entering and exiting the enclave. One or more VAs may also be used to facilitate paging, as further described below.

The security attributes of each page are stored in a micro-architectural data structure called an enclave page cache map (EPCM) that is used by memory access control unit 260 to enforce the protections provided by the secure enclaves architecture. The EPCM stores one entry for each page in the EPC. Each entry includes an identifier (e.g., a 64 bit field) of the SECS (i.e., the enclave) to which the page belongs. These identifiers may be referred to by secure enclaves instructions (e.g., the address of the SECS may be stored in a register such as RCX, the address of a micro-architectural data structure including the address of the SECS may be stored in a register such as RBX, etc.) such as EADD, EEXTEND, and EINIT, to provide for the SECS to be read by hardware in order to execute the instruction.

Returning now to FIG. 1, EPA logic/hardware 1106, EWB logic/hardware 1107, EWBPS logic/hardware 1108, ELDPS logic/hardware 1109, and ELD logic/hardware 1110 provide for instructions that may be used by an operating system or other software to manage EPC 300 and provide a virtual memory space, for use by one or more secure processing environments, that is larger than the size of EPC 300, where each secure processing environment may be maintained across power cycles.

As described in more detail below, an EWB instruction may be used to write back or evict a page (other than a root version array page, as described below), such as code/data page 332, from EPC 300 to system memory 120. An EWBPS instruction may be used to evict a root version array page entry from EPC 300 to non-volatile storage 120. An ELDPS instruction may be used to reload a previously evicted root version array page entry from non-volatile storage 120 into EPC 300. An ELD instruction may be used to reload a previously evicted page (other than a root version array page) from system memory 120 into EPC 300.

An EPA instruction may be used to allocate a special EPC page, such as VA page 342, on which to store a unique version number for each evicted page, such that the version number may be checked when the page is reloaded into the EPC to ensure that it is the same as the evicted page, thereby protecting the EPC from replay attacks. A VA page may contain an array of slots (e.g., a 4 KB VA page may contain 512 slots), each slot to store a version number of an evicted page. A slot may be allocated for use when a page is evicted, and, when a page is reloaded, freed for re-use when another (the same or different) page is evicted. A VA page may be shared by more than one enclave.

So that the number of pages that may be paged out at any one time is not limited by the size of a VA page, an EPC may include multiple, hierarchical (i.e., arranged in an inverted tree structure) VA pages. For example, a first VA page may be used to store version information for a first set of 512 code/data pages, a second VA page may be used to store version information for a second set of 512 code/data pages, and a third VA page may be used to store version information for the first VA page (when it is evicted), the second VA page (when it is evicted), and up to 510 additional VA or code/data pages (when they are evicted). In this example, the third VA page may be referred to as the root VA page, assuming that no version information for the third VA page is stored on another VA page. In general, the root VA page is the VA page at the highest level of the hierarchy, in other words, the VA page from which all evicted pages may be referenced, whether directly (i.e., the version information for the evicted page is stored on the root VA page) or indirectly (i.e., the version information for the evicted page is stored on an evicted VA page at a level in the hierarchy between the root VA page and the evicted page). An EPC may have only one root VA page.

In connection with the execution of an EWB instruction, the contents of the EPC page to be evicted are encrypted (e.g., by encryption unit 270 or 280), and a MAC is generated based on the encrypted contents, the security attributes of the page, and the version number of the page. The parameters for an EWB instruction may include a pointer to the EPC page to be paged out, a pointer to an empty slot in a VA page in which to store a version number of the page to be paged out, and pointers to memory locations outside of the EPC page in which to store the encrypted page, an integrity check value, secure enclave control structure (SECS) information, and any other metadata for the page. Any page in an EPC, including VA pages and SECS pages, may be paged out using an EWB instruction, except for a root VA page.

A root VA page entry may be evicted using an EWBPS instruction. The parameters for an EWBPS instruction may include a pointer to the root VA page entry to be evicted. Before evicting a root VA page entry, system software is responsible for paging out (e.g., using EWB instructions) all other pages in the EPC, in an order consistent with the VA page hierarchy, until only the root VA page with one VA entry (LAST_VA_VERSION, the version number of the last VA page to be paged out) remains. Execution of the EWBPS instruction causes the processor to write back, for example to non-volatile storage 290, a blob (a "PS blob") containing the paging context and version of the last valid page.

The PS blob may be generated by the processor, in response to the EWBPS instruction, by encrypting a combination of inputs, including LAST_VA_VERSION, PSVERSION, PK, PI, EID, and SVN, each as described above or as follows. PSVERSION is a unique version number for the root VA, such that the version number may be checked when the EPC is reloaded after power is restored, thereby protecting the EPC from replay attacks. PK is the paging key used to encrypt and decrypt the contents of pages and/or generate a MAC in connection with the execution of paging instructions (e.g., EWB and ELD), and may be initialized to a random value and stored in a control register (e.g., in storage unit 212 or 222). PI is the key used to encrypt the PS blob, and may be derived from the hardware base key (e.g., key 272 or key 282). EID is the value used to create enclave identifiers, e.g., in connection with the execution of ECREATE instructions, and may be a value initialized to zero and incremented as each enclave is created. SVN is one or more security version numbers, each of which may be assigned to an enclave that uses the EPC.

A root VA page entry may be reloaded using an ELDPS instruction. In an embodiment, prior to executing an ELDPS instruction, a new VA page is created in the EPC, using the EPA instruction, to serve as a root VA page. In another embodiment, the new VA page may be created as part of the execution of an ELDPS instruction. In either embodiment, execution of an ELDPS instruction includes reading the PS blob from non-volatile storage and decrypting (e.g., by encryption unit 270 or 280) the PS blob, verifying the version number and corresponding MAC, using the contents of the decrypted PS blob to restore the EPC paging context present at the time that the most recent EWBPS instruction was executed, and loading the version number of the last VA page to be evicted into an empty slot in the root VA page.

Any evicted page, including VA pages (but not a root VA page) and SECS pages, may be paged back in using an ELD instruction. In connection with the execution of an ELD instruction, the encrypted contents of an EPC page to be reloaded are decrypted (e.g., by encryption unit 270 or 280), the version number and corresponding MAC are verified, the unencrypted page is reloaded into EPC 300, the EPCM information is restored to the EPCM. The parameters for an ELD instruction may include pointers to the encrypted page to be paged back in and its associated metadata, a pointer to a free page location in the EPC in which to load the page, a pointer to the SECS for the secure enclave to which the page is allocated, and a pointer to the slot in the VA page in which the version number of the page is stored. Different versions of an ELD instruction may be available for reloading pages in different states, for example, in a blocked state or an unblocked state.

Figure 4:
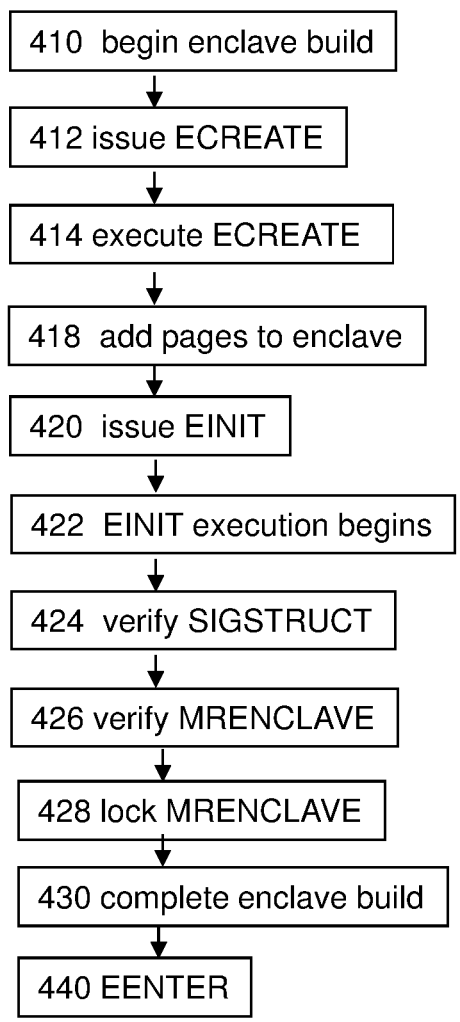
FIG. 4 illustrates a method for building a secure processing environment to be maintained across power cycles according to an embodiment of the present invention.

FIG. 4 illustrates a method 400 for building a secure processing environment to be maintained across power cycles according to an embodiment of the present invention. Although method embodiments of the invention are not limited in this respect, reference may be made to elements of FIGS. 1, 2, and 3 to help describe the method embodiment of FIG. 4. Method 400 includes the building of a secure enclave using ECREATE, EADD, EEXTEND, EINIT, and EENTER instructions; however, embodiments of the present invention are not limited to these specifically named instructions. Various portions of method 400 may be performed independently by or with a combination of hardware (e.g., instruction unit 214/224, execution unit 216/226, and/or control unit 218/228), firmware, software, a user of an information processing system, etc.

In box 410 of method 400, a build of an enclave begins. In box 412, an ECREATE instruction is issued, for example by an installer application, to create the enclave. In box 414, execution of the ECREATE instruction, for example by execution unit 216 or 226, begins. In one embodiment, execution of the ECREATE instruction includes the allocation of a range of addresses for use by the enclave. In one embodiment, the addresses may be a first type of address, for example a virtual or linear addresses, to be translated to a second type of address, for example a physical address in a system memory such as system memory 120.

Execution of the ECREATE instruction may also include establishing attributes of the enclave and storing the enclave attributes in an SECS, for example, in ATTRIBUTES field 316 of SECS 310. A micro-architectural data structure (e.g., PAGEINFO), may be associated with the ECREATE instruction (e.g., its address in the RBX register). PAGE- INFO may have a field specifying the address of a source SECS to be copied to SECS 310. The source SECS may include a source SECS ATTRIBUTES bit array to be copied to SECS ATTRIBUTES field 316.

In box 418, the installer application may add one or more pages (or other regions) to the enclave, for example by issuing one or more EADD instructions, and have them measured, for example by issuing one or more EEXTEND instructions. Adding a page to the enclave may include copying a source page from system memory into the EPC and associating the EPC page with the enclave's SECS. The source page may be a regular page containing unencrypted code, data, or other information for the code/data region of the enclave, or the source page may be a TCS page containing metadata for the TCS region. Having them measured may include incrementally calculating or extending a cryptographic hash based on the content, location, and/or other attributes of the page or pages, and storing the hash in MRENCLAVE 312.

In box 420, the installer application issues an EINIT instruction in order to finalize the build of the enclave and initialize it. In box 422, execution of the EINIT instruction, for example by execution unit 216 or 226, begins.

Execution of the EINIT instruction may include, in box 424, verifying that an enclave certificate or signature structure (SIGSTRUCT) provided by the installer or signer of the enclave is valid by using the using a key included in the certificate or signature structure. Execution of the EINIT instruction may also include, in box 426, verifying that the contents of MRENCLAVE 312 matches the expected value of MRENCLAVE provided in the certificate or signature structure, where the final value of MRENCLAVE 312 may be a unique secure hash algorithm, (e.g., SHA-256) digest that identifies, cryptographically, the code and data placed inside the enclave, the position and placement order of the pages inside the enclave, and the security properties of each page.

In box 428, execution of the EINIT instruction may continue with the locking of MRENCLAVE 312 such that its contents remain unchanged, even by the subsequent execution of an EADD or an EEXTEND instruction, and the setting of an attribute indicator in the SECS to prevent any more regions or pages from being added to the enclave. In box 430, the build of the enclave is complete. In box 440, the enclave may be entered (e.g., by issuing an EENTER instruction) in order to securely execute a software application within the enclave.

FIG. 5 illustrates a method 500 for maintaining a secure processing environment across power cycles according to an embodiment of the present invention. Although method embodiments of the invention are not limited in this respect, reference may be made to elements of FIGS. 1, 2, 3, and 4 to help describe the method embodiment of FIG. 5. Method 500 includes the use and maintenance of a secure processing environment, such as a secure enclave built according to method 400, using EPA, EWB, EWBPS, ELDPS, and ELD instructions; however, embodiments of the present invention are not limited to these specifically named instructions. For convenience, method 500 shows the eviction of one of each type of EPC page; however, methods according to various embodiments of the present invention may include the eviction of any number of each type of EPC page, depending on how many EPC pages are being used at the time that an power down is to be initiated. Various portions of method 500 may be performed independently by or with a combination of hardware (e.g., instruction unit 214/224, execution unit 216/226, and/or control unit 218/228), firmware, software, a user of an information processing system, etc. In an embodiment, the EPA, EWB, EWBPS, ELDPS, and ELD instructions issued and executed as described below may be within operated system software installed, running, and/or executing on processor 110.

In box 510, execution of a first issuance of an EPA instruction begins. In box 512, as part of the execution of the EPA instruction, a first VA page (e.g., VA page 342) is created in EPC 300 to be used to store version information for evicted pages. More than one VA page may be created within the scope of the present invention, and VA pages may also be paged out so long as the version information for an evicted VA page is stored in another VA page that is present in EPC 300, and so long as any VA page that is paged out is paged back in before paging back in any page whose version information is stored in that VA page. Any page layout and/or type of data structure may be used for storing version numbers and/or other information in version array pages and creating a hierarchy of VA pages.

In box 514, execution of a second issuance of an EPA instruction begins. In box 516, as part of the execution of the EPA instruction, a second VA page (e.g., VA page 344) is created in EPC 300 to serve as a root VA page. Note that in some embodiments, some boxes shown in FIG. 5 may be omitted, including boxes 514 and 516 because a single VA page (e.g., VA page 342) may be used, in which case that single VA page would serve as the root VA page and in which case boxes 550 to 558 (regarding the eviction of VA page 342 as described below) would also be omitted. In other embodiments, additional VA pages may be created in order to construct other VA page hierarchies.

In box 520, execution of a first issuance of an EWB instruction begins. In box 522, as part of the execution of the EWB instruction, the contents of a first page (e.g., code/data page 332) to be evicted from EPC 300 are encrypted (e.g., by encryption unit 270 or 280, using PK) to generate a first encrypted page. Any encryption algorithm or technique may be used within the scope of the present invention. In box 524, as part of the execution of the EWB instruction, a first integrity check value, a first anti-replay value, and/or first metadata are generated for the first page and/or the first encrypted page. Any approach to integrity checking, anti-replay protection, and/or other verification or authentication may be used within the scope of the present invention. In box 526, as part of the execution of the EWB instruction, a first unique version number, for the first page, is stored in a first empty slot in a VA page (e.g., VA page 342). In box 528, as part of the execution of the EWB instruction, the first encrypted page, the first metadata, and the EPCM information for the first page are written to system memory 120.

In box 530, execution of a second issuance of an EWB instruction begins. In box 532, as part of the execution of the EWB instruction, the contents of a second page (e.g., TCS page 322) to be evicted from EPC 300 are encrypted (e.g., by encryption unit 270 or 280, using PK) to generate a second encrypted page. In box 534, as part of the execution of the EWB instruction, a second integrity check value, a second anti-replay value, and/or second metadata are generated for the second page and/or the second encrypted page. In box 536, as part of the execution of the EWB instruction, a second unique version number, for the second page, is stored in a second empty slot in a VA page (e.g., VA page 342). In box 538, as part of the execution of the EWB instruction, the second encrypted page, the second metadata, and the EPCM information for the second page are written to system memory 120.

In box 540, execution of a third issuance of an EWB instruction begins. In box 542, as part of the execution of the EWB instruction, the contents of a third page (e.g., SECS page 310) to be evicted from EPC 300 are encrypted (e.g., by encryption unit 270 or 280, using PK) to generate a third encrypted page. In box 544, as part of the execution of the EWB instruction, a third integrity check value, a third anti-replay value, and/or third metadata are generated for the third page and/or the third encrypted page. In box 546, as part of the execution of the EWB instruction, a third unique version number, for the third page, is stored in a third empty slot in a VA page (e.g., VA page 342). In box 548, as part of the execution of the EWB instruction, the third encrypted page, the third metadata, and the EPCM information for the third page are written to system memory 120.

In box 550, execution of a fourth issuance of an EWB instruction begins. In box 552, as part of the execution of the EWB instruction, the contents of the first VA page (e.g., VA page 342) to be evicted from EPC 300 are encrypted (e.g., by encryption unit 270 or 280, using PK) to generate a fourth encrypted page. In box 554, as part of the execution of the EWB instruction, a fourth integrity check value, a fourth anti-replay value, and/or fourth metadata are generated for the fourth page and/or the fourth encrypted page. In box 556, as part of the execution of the EWB instruction, a fourth unique version number, for the fourth page, is stored in an empty slot in the root VA page (e.g., VA page 344). In box 558, as part of the execution of the EWB instruction, the fourth encrypted page, the fourth metadata, and the EPCM information for the fourth page are written to system memory 120.

Boxes 520 to 528, 530 to 538, 540 to 548, and/or 550 to 558 may be repeated as many times as needed to evict all pages, except the root VA page, being used in EPC 300, until only a single entry remains in the root VA page.

In box 560, execution of an issuance of an EWBPS instruction begins. In box 562, as part of the execution of the EWBPS instruction, a combination of inputs, including a LAST_VA_VERSION (from the last remaining entry in the root VA page), a PSVERSION, a PK, a PI, an EID, and an SVN, is encrypted (e.g., by encryption unit 270 or 280, using PI) to generate a PS blob. In box 564, as part of the execution of the EWBPS instruction, the PS blob is written to non-volatile storage 290.

In box 566, power is removed from at least a portion of processor 110, for example, in connection with an entry into a standby, sleep, suspend, or other power management state. In an embodiment, power may be removed from processor package pins or other external connectors 242 that supply power to processor circuitry including EPC 300, while power is maintained to pin 292 that supplies power to non-volatile storage 290. In box 568, processor 110 temporarily remains in a standby, sleep, suspend, or other power management state, without power being applied to maintain the contents of EPC 300.

In box 570, power is re-applied to that portion of processor 110 that includes EPC 300, for example, in connection with an exit from the standby, sleep, suspend, or other power management state. In box 572, restoration of the processor's support for a secure processing environment begins (e.g., by basic input/output system firmware), including setting up of PRMRR 213/223/250; installation of any microcode patches, authenticated code modules, and/or any other firmware and/or software to support a secure processing environment or other capabilities or functionalities of the processor; and enabling support for a secure processing environment.

In box 574, execution of a third issuance of an EPA instruction begins. In box 576, as part of the execution of the EPA instruction, a third VA page (e.g., VA page 344), with all entries empty, is created in EPC 300 to serve as a root VA page. This third VA page may be created at the same physical and/or logical location in EPC 300 as the second VA page, which served as the root VA page during execution of the EWBPS instruction. Therefore, the third VA page is also represented by VA page 344.

In box 580, execution of an issuance of ELDPS instruction begins. In box 584, as part of the execution of the ELDPS instruction, the PS blob is read from non-volatile storage 290. In box 586, as part of the execution of the ELDPS instruction, the PS blob is decrypted (e.g., by encryption unit 270 or 280, using PI) and integrity checked. In box 588, as part of the execution of the ELDPS instruction, the contents of the decrypted PS blob are used to restore the EPC paging context present at the time that the EWBPS instruction was executed. Restoring the EPC paging context may include loading PK into a paging key location in a key register and loading the paging context registers (e.g., the CR_PAGING_VERSION registers, such as loading LAST_VA_VERSION into a register for the version number of the last page to be evicted). Note that these registers (e.g., the paging key and paging context registers) may be loaded with new/initialization values in connection with the powering-up of processor 110; therefore, box 588 may involve overwriting of these initialization values.

In box 590, as part of the execution of the ELDPS instruction, the version number of the last VA page to be evicted is loaded into an empty slot in the root VA page. Note that if execution of the ELDPS instruction does not complete successfully (e.g. the decryption and/or integrity checking of the PS blob fails), processor 110 may nevertheless support a secure processing environment using a paging context generated in response to the most recent power up (including a new paging key and other initialization values for the paging context registers); however, no previously created secure processing environments may be restored according to embodiments of the present invention. Instead, they may be rebuilt according to any previously known technique in which secure processing environments are not maintained across power cycles.

Assuming successful completion of the ELDPS instruction, the secure processing environment(s) built prior to the standby, sleep, suspend, or other power management state may be restored (e.g., by the operating system) by reloading (e.g., by issuing ELD instructions) EPC 300 with the EPC pages that were evicted (e.g., by the operating system) in preparation for the standby, sleep, suspend, or other power management state. These pages may be reloaded in any order consistent with the VA page hierarchy and code/data pages may be reloaded on demand.

For example, in box 592, execution of an issuance of an ELD instruction begins. In box 594, as part of the execution of the ELD instruction, the encrypted contents of a page (e.g., VA page 342) are read from system memory 120 and decrypted (e.g., by encryption unit 270 or 280, using PK) to generate a decrypted page. In box 596, an integrity check value, an anti-replay value, and/or other metadata for the page are checked by to verify the integrity of the page, including checking that the version is the same version that was last written out (e.g., for VA page 342, the version number stored in the root VA page). In box 598, the unencrypted page is reloaded into EPC 300 and the EPCM information is restored to the EPCM.

In various embodiments of the present invention, the methods illustrated in FIGS. 4 and 5 may be performed in a different order, with illustrated boxes combined or omitted, with additional boxes added, or with a combination of reordered, combined, omitted, or additional boxes. Furthermore, method embodiments of the present invention are not limited to method 400, method 500, or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of methods 400 and/or 500 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for maintaining a secure processing environment across power cycles have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
an instruction unit to receive a first instruction, wherein the first instruction is to evict a root version array page entry from a secure cache; and
an execution unit to execute the first instruction, wherein execution of the first instruction includes generating a blob to contain information to maintain a secure processing environment across a power cycle and storing the blob in a non-volatile memory, wherein generating the blob is to include encrypting a combination of inputs reflecting context of the secure cache, the combination of inputs to include a version number of the root version array page.

2. The processor of claim 1, wherein the combination of inputs is also to include a version number of the last page evicted from the secure cache.

3. The processor of claim 1, wherein the combination of inputs is also to include a paging key used to encrypt and decrypt the contents of secure cache pages.

4. The processor of claim 1, wherein the combination of inputs is also to include a blob key used to encrypt the blob.

5. The processor of claim 1, wherein the combination of inputs is also to include a value used to create enclave identifiers in connection with the execution of a secure processing environment creation instruction.

6. The processor of claim 1, wherein the combination of inputs is also to include one or more security version numbers, each assigned to a secure processing environment that uses the secure cache.

7. The processor of claim 1, wherein:
the instruction unit is also to receive a second instruction, wherein the second instruction is to restore context of the secure cache; and
the execution unit is also to execute the second instruction, wherein execution of the second instruction includes reading the blob from the non-volatile memory and decrypting the blob.

8. The processor of claim 7, wherein execution of the second instruction also includes loading, into an entry in a root version array page, the version number of the last page evicted from the secure cache.

9. A method comprising:
receiving a first instruction, wherein the first instruction is to evict a root version array page entry from a secure cache; and
executing the first instruction, wherein execution of the first instruction includes generating a blob to contain information to maintain a secure processing environment across a power cycle and storing the blob in a non-volatile memory, wherein generating the blob is to include encrypting a combination of inputs reflecting context of the secure cache, the combination of inputs to include a version number of the root version array page.

10. The processor of claim 9, wherein the combination of inputs is also to include a paging key used to encrypt and decrypt the contents of secure cache pages, a blob key used to encrypt the blob, a value used to create enclave identifiers in connection with the execution of a secure processing environment creation instruction, and one or more security version numbers, each assigned to a secure processing environment that uses the secure cache.

11. The method of claim 10, further comprising:
receiving a second instruction, wherein the second instruction is to restore context of the secure cache; and
executing the second instruction, wherein execution of the second instruction includes reading the blob from the non-volatile memory and decrypting the blob.

12. The method of claim 11, further comprising recreating a root version array page.

13. The method of claim 12, wherein recreating the root version array page is in response to a third instruction.

14. The method of claim 12, wherein execution of the second instruction also includes loading, into an entry in the root version array page, the version number of the last page evicted from the secure cache.

15. The method of claim 12, further comprising:
receiving one or more issuances of a third instruction, wherein the third instruction is to evict a page from the secure cache, and wherein the issuances of the third instruction are to empty the secure cache before issuing the first instruction; and
executing the one of more issuances of the third instruction, wherein execution of the third the page and writing the encrypt system memory.

16. The method of claim 15, further comprising:
receiving one or more issuances of a fourth instruction, wherein the fourth instruction is to reload a page into the secure cache, and wherein the issuances of the fourth instruction are to rebuild the secure cache after issuing the second instruction, where the second instruction is issued after power is restored to the secure cache during the power cycle; and
executing the one of more issuances of the fourth instruction, wherein execution of the fourth instruction includes reading the encrypted page from the system memory, decrypting the encrypted page, and reloading the decrypted page into the secure cache.

17. A system comprising:

a non-volatile memory; and a processor including
- an instruction unit to receive a first instruction, wherein the first instruction is to evict a root version array page entry from a secure cache; and
- an execution unit to execute the first instruction, wherein execution of the first instruction includes generating a blob to contain information to maintain a secure processing environment across a power cycle and storing the blob in the non-volatile memory, wherein generating the blob is to include encrypting a combination of inputs reflecting context of the secure cache, the combination of inputs to include a version number of the root version array page.

* * * * *